United States Patent
Im et al.

(10) Patent No.: US 8,107,191 B2
(45) Date of Patent: Jan. 31, 2012

(54) PERPENDICULAR MAGNETIC RECORDING HEAD HAVING A COIL ENCLOSING A SUB-YOKE

(75) Inventors: Young-hun Im, Suwon-si (KR); Kook-hyun Sunwoo, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1092 days.

(21) Appl. No.: 11/949,278

(22) Filed: Dec. 3, 2007

(65) Prior Publication Data
US 2008/0180838 A1    Jul. 31, 2008

(30) Foreign Application Priority Data
Jan. 26, 2007  (KR) .................. 10-2007-0008584

(51) Int. Cl.
*G11B 5/147* (2006.01)
*G11B 5/17* (2006.01)
(52) U.S. Cl. .......... 360/125.06; 360/125.08; 360/123.11
(58) Field of Classification Search ............. 360/125.06, 360/125.08, 125.12, 123.05, 123.11
See application file for complete search history.

(56) References Cited

U.S. PATENT DOCUMENTS

| | | | |
|---|---|---|---|
| 7,382,574 B2 * | 6/2008 | Li et al. ................ 360/125.08 |
| 7,443,632 B1 * | 10/2008 | Stoev et al. ............ 360/123.05 |
| 2003/0193744 A1 * | 10/2003 | Takahashi et al. .......... 360/126 |
| 2004/0037002 A1 * | 2/2004 | Kudo et al. .................. 360/126 |
| 2005/0007696 A1 * | 1/2005 | Chen et al. ................... 360/126 |
| 2005/0117250 A1 * | 6/2005 | Oikawa ....................... 360/125 |
| 2007/0115583 A1 * | 5/2007 | Bonhote et al. ............. 360/126 |
| 2008/0117546 A1 * | 5/2008 | Le et al. .................. 360/125.03 |

FOREIGN PATENT DOCUMENTS

JP    2006-323899 A    11/2006

* cited by examiner

*Primary Examiner* — Jefferson Evans
(74) *Attorney, Agent, or Firm* — Sughrue Mion, PLLC

(57) ABSTRACT

A perpendicular magnetic recording (PMR) head is provided which records data in a PMR medium. The PMR head includes a main pole having an end portion disposed on an air bearing surface (ABS) opposed to the PMR medium and the other end portion; a return yoke spaced apart from the main pole; a sub-yoke starting from the other end portion of the main pole and extending away from the PMR medium, so as to magnetically connect the main pole with the return yoke; and a coil disposed to encircle the sub-yoke.

8 Claims, 4 Drawing Sheets

PERPENDICULAR MAGNETIC RECORDING HEAD HAVING A COIL ENCLOSING A SUB-YOKE

CROSS-REFERENCE TO RELATED PATENT APPLICATIONS

This application claims priority from Korean Patent Application No. 10-2007-0008584, filed on Jan. 26, 2007, in the Korean Intellectual Property Office, the disclosure of which is incorporated herein in its entirety by reference.

BACKGROUND OF THE INVENTION

1. Field of the Invention

Apparatuses consistent with the present invention relate to a perpendicular magnetic recording head and, more particularly, to a perpendicular magnetic recording head, which improves the shape of a sub-yoke so as to apply a sufficient magnetic field to record data on a recording medium, even with a main pole having a small pole tip.

2. Description of the Related Art

A magnetic recording method may be mainly classified into a longitudinal magnetic recording method and a perpendicular magnetic recording method. The longitudinal magnetic recording method, involves magnetizing a magnetic layer in a direction parallel to the surface of the magnetic layer to record data, and the perpendicular magnetic recording method involves recording data magnetizing the magnetic layer in a direction perpendicular to the surface of the magnetic layer to record data. Since the perpendicular magnetic recording method is much superior in terms of recording density as compared to the longitudinal magnetic recording method, perpendicular magnetic recording heads having various structures are being developed.

Referring to FIG. 1, a related art perpendicular magnetic recording (PMR) head includes a perpendicular magnetic recording medium 10 (hereinafter, a recording medium 10), a recording head 20 for recording data on the recording medium 10, and a read head 30 for reading data recorded on the recording medium 10.

The recording head 20 includes a main pole 22, a return yoke 24, and a coil 26. The coil 26 functions to generate a recording magnetic field required for recording data on the recording medium 10. The main pole 22 and the return yoke 24 form a magnetic path of the recording magnetic field generated by the coil 26, and are formed of a magnetic material, such as NiFe. By controlling the Ni and Fe content, the main pole 22 and the return yoke 24 may have appropriate saturation flux density Bs and magnetic permeability. A sub-yoke 28 is disposed on one side of the main pole 22 and forms the magnetic path of the recording magnetic field along with the main pole 22 and the return yoke 24.

The read head 30 includes first and second shields 32 and 34 and a read sensor 36 interposed between the first and second shields 32 and 34.

The recording medium 10 includes a soft-magnetic underlayer 11, an intermediate layer 12, and a recording layer 13. When current is supplied to the coil 26, a magnetic field that is generated around the coil 26 forms a magnetic path that leads from an end tip of the main pole 22 through the soft-magnetic underlayer 11 to the return yoke 24. In this case, a magnetic domain of the recording layer 13 is magnetized by a perpendicular component of the magnetic field so that data is recorded on the recording layer 13.

A magnetized unit is referred to as a recording bit, and the recording density is conventionally referred to as an areal density, which is calculated as the number of recording bits per 1 inch$^2$. In order to increase the areal density, the lengths of the recording bit measured in both a down track direction and a cross track direction should be reduced. The length of the recording bit measured in the down track direction depends on the moving speed of the recording medium 10, the frequency of a recording current, and the length of an end tip of the main pole 22 near the recording medium 10 (i.e., the length of a pole tip of the main pole 22) measured in the down track direction. Also, the length of the recording bit measured in the cross track direction depends on the length of the pole tip measured in the cross track direction. That is, the size of the pole tip should be reduced to increase the areal density. However, as the size of the pole tip decreases, a magnetic field generated from the pole tip decreases and recording characteristics deteriorate, thus making it difficult to increase the recording density. Therefore, a problem resulting in the reduction in a magnetic field should be solved in order to increase the recording density and achieve a stable recording characteristic.

SUMMARY OF THE INVENTION

Exemplary embodiments consistent with the present invention provide a perpendicular magnetic recording (PMR) head in which a pole tip has a small size and a sub-yoke has an improved shape so as to supply a sufficient magnetic field to a recording medium.

According to an aspect of the present invention, there is provided a PMR head for recording data in a PMR medium. The PMR head includes: a main pole comprising a first end portion disposed on an air bearing surface (ABS) opposite to the PMR medium, and a second end portion; a return yoke spaced apart from the main pole; a sub-yoke starting from the second end portion of the main pole and extending away from the PMR medium, so as to magnetically connect the main pole with the return yoke; and a coil disposed to enclose the sub-yoke.

The sub-yoke may have a convex shape toward the return yoke.

The main pole may have a higher saturation flux density than any one of the sub-yoke and the return yoke.

A minimum region of the sub-yoke required for the magnetic connection of the sub-yoke with the main pole may be in contact with the main pole.

According to another aspect of the present invention, there is provided a PMR head including: a recording head unit for recording data on a PMR medium; and a read head unit for reading data recorded on the PMR medium. The recording head unit includes: a main pole comprising a first end portion disposed on an ABS that is opposite to the PMR medium, and a second end portion; a return yoke spaced apart from the main pole; a plurality of sub-yokes starting from the second end portion and extending away from the PMR medium, so as to magnetically connect the main pole with the return yoke; and a plurality of coils disposed to enclose the sub-yokes, respectively.

BRIEF DESCRIPTION OF THE DRAWINGS

The above and other features and aspects of the present invention will become more apparent by describing in detail exemplary embodiments thereof with reference to the attached drawings, in which.

DETAILED DESCRIPTION OF EXEMPLARY EMBODIMENTS OF THE INVENTION

Figure 1:
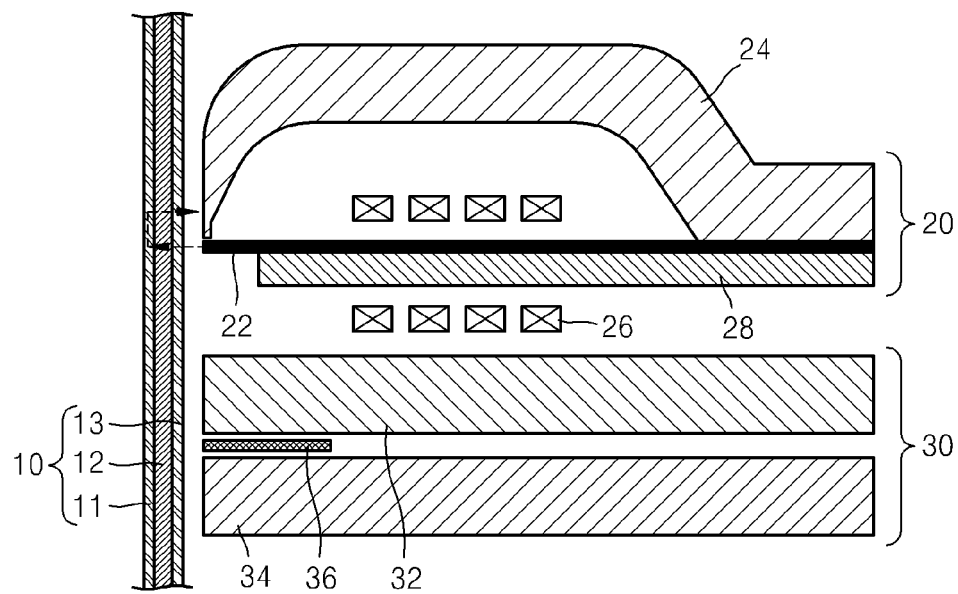
FIG. 1 illustrates a related art perpendicular magnetic recording (PMR) head.

A perpendicular magnetic recording (PMR) head consistent with the present invention will now be described more fully with reference to the accompanying drawings, in which exemplary embodiments of the invention are shown. In the drawings, the thicknesses of layers and regions are exaggerated for clarity. The same reference numerals are used to denote the same elements throughout the specification.

Figure 2:
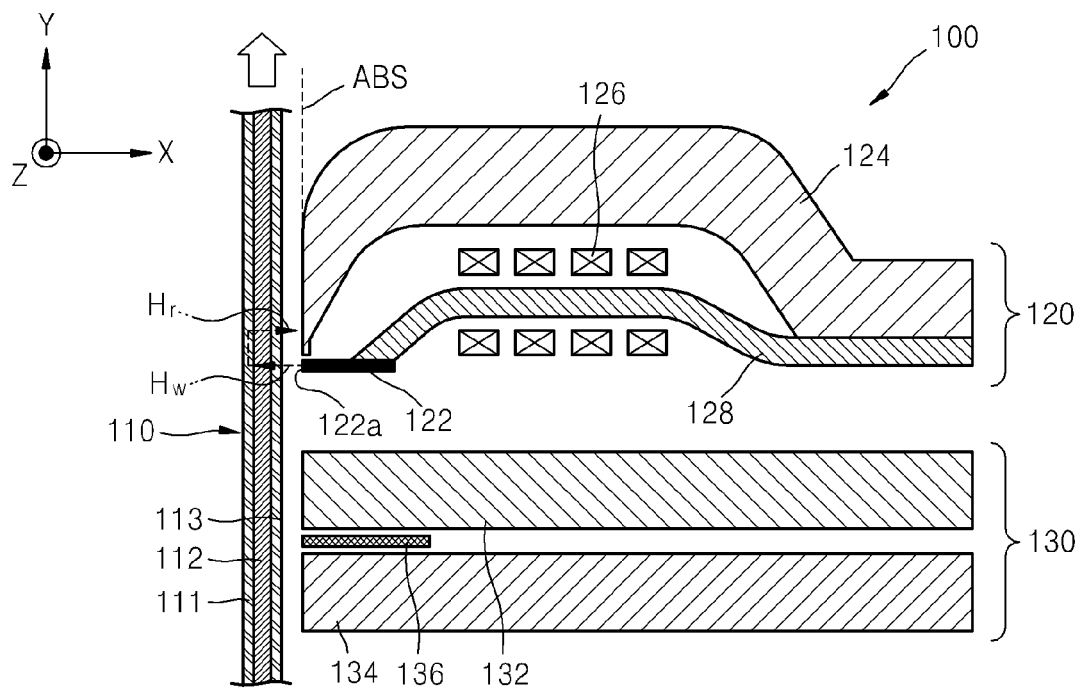
FIG. 2 illustrates a PMR head according to an exemplary embodiment of the present invention.

Referring to FIG. 2, a PMR head 100 according to an exemplary embodiment of the present invention includes a recording head unit 120 which applies a magnetic field to the perpendicular magnetic recording medium 110 (hereinafter, a recording medium 110) to record data on the recording medium 110. Also, the PMR head 100 may further include a read head unit 130, which reads data recorded on the recording medium 110.

The recording head unit 120 includes a main pole 122, a return yoke 124, and a sub-yoke 128. The main pole 122, the return yoke 124, and the sub-yoke 128 are formed of a magnetic material, such as NiFe, so as to form a magnetic path of a recording magnetic field generated by a coil 126. The main pole 122, the return yoke 124, and the sub-yoke 128 are formed of NiFe, and their saturation flux density Bs and permeability are appropriately determined by controlling the Ni and Fe contents. The main pole 122 has an end portion 122a, which is disposed on an air bearing surface (ABS) opposite to the recording medium 110. As illustrated in FIG. 2, the ABS is defined as a surface of the recording head unit 120 disposed opposite to the recording medium 110, and the return yoke 124 is spaced apart from the main pole 122. Hence, the ABS, on which the end portion 122a is disposed, is such that there is a gap between the return yoke 124 and the main pole 122, and such gap is appropriately determined such that the recording magnetic field forms a return path via a soft magnetic underlayer 111 of the recording medium 110. Thus, the gap may have a length of about 500 nm or less. The sub-yoke 128 magnetically connects the main pole 122 and the return yoke 124 to form the magnetic path of the recording magnetic field generated by the coil 126. Also, the sub-yoke 128 aids to focus the magnetic field on the end portion 122a of the main pole 122. Since the quantity of flux that can focus on the end portion 122a of the main pole 122 is restricted by the saturation flux density Bs, the main pole 122 may be formed of a material having a higher saturation flux density Bs than the sub-yoke 128 or the return yoke 124. Also, the sub-yoke 128 or the return yoke 124 may be formed to have a higher permeability than the main pole 122 such that the sub-yoke 128 or the return yoke 124 has high-speed responsivity to a change in radio-frequency (RF) magnetic field. The sub-yoke 128 starts from the other end portion of the main pole 122 which is opposite to the end portion 122a of the main pole 122 and extends away from the recording medium 110. A predetermined region of the sub-yoke 128 is in contact with the main pole 122. In this case, a minimum region of the sub-yoke 128 required for magnetic connection is in contact with the main pole 122. Furthermore, the sub-yoke 128 may have a convex shape similar to that of the return yoke 124, and be close to the return yoke 124. The coil 126 can enclose the sub-yoke 128. For example, the coil 126 may be formed as a type of solenoid or toroid around the sub-yoke 128.

The read head unit 130 is further provided on a lower side to the recording head unit 120 to read data recorded on the recording medium 110. The read head unit 130 includes a first shield 132, a second shield 134, and a read sensor 136 interposed between the first and second shields 132 and 134, and the read sensor 136 may generate an electric signal from magnetization recorded on the recording medium 110. For example, the read sensor 136 may be a magneto-resistive (MR) sensor, a giant MR (GMR) sensor, or a tunneling MR (TMR) sensor.

The functions of the PMR head having the above-described construction will now be described. A magnetic field generated by current supplied to the coil 126 forms a magnetic path that leads from the return yoke 124 through the sub-yoke 128 to the main pole 122. In this case, since there is the gap between the return yoke 124 and the main pole 122, the magnetic field generated at the main pole 122 forms a magnetic path that leads through the recording medium 110 to the return yoke 124. Specifically, the recording medium 110 includes the soft magnetic underlayer 111, an intermediate layer 112, and a recording layer 113, and thus, a recording magnetic field is applied from the end portion 122a of the main pole 122 through the soft magnetic underlayer 111 to the return yoke 124. In this case, a magnetic domain of the recording layer 113 is magnetized by a perpendicular component of the magnetic field so that data can be recorded on the recording layer 113. Also, since the recording medium 110 moves in the arrow direction, the Y direction, as illustrated in FIG. 2, data is sequentially recorded on the recording medium 110. The recording magnetic field can be divided into a recording field Hw, which is from the end portion 122a of the main pole 122 and towards the recording medium 110, and a return field Hr, which passes through the recording medium 110 and towards the return pole 124. The specific values of the recording field Hw and the return field Hr affect the recording characteristics. For instance, since the recording medium 110 moves in the arrow direction, when the return field Hr, which is generated in an opposite direction to the recording field Hw, is greater than the recording field Hw, the magnetization of a recording bit is weakened. Thus, a high recording field Hw and a low return field Hr are advantageous to the recording performance.

Figure 3:
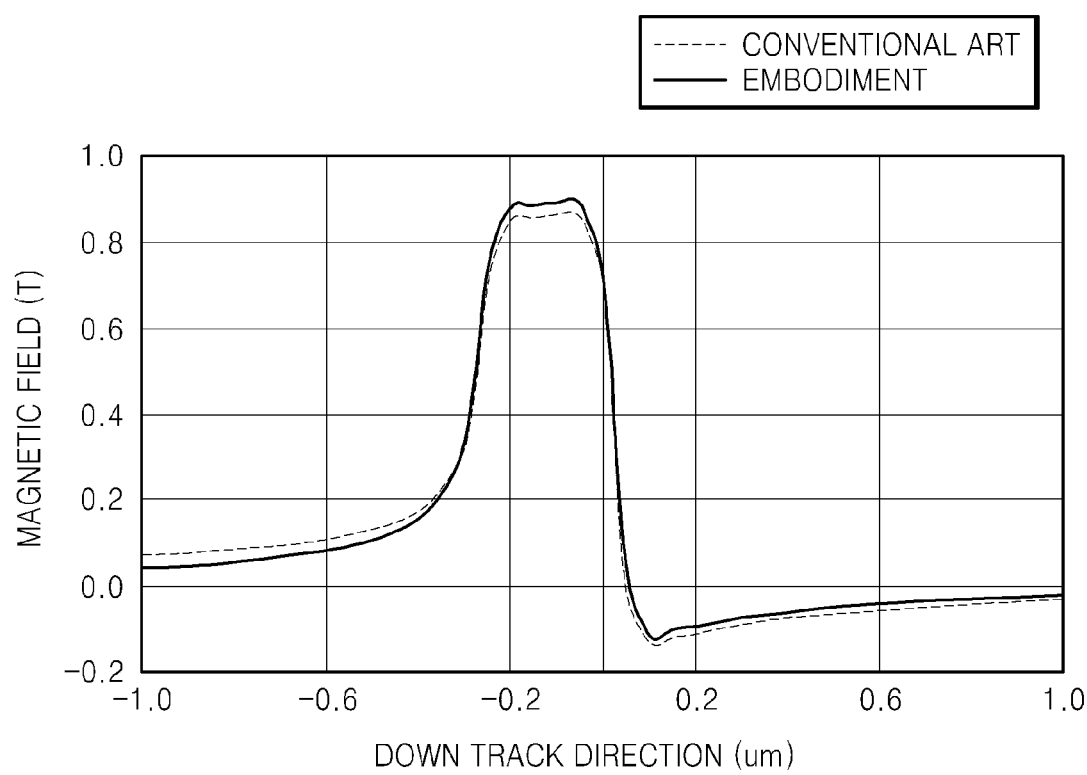
FIG. 3 is a graph showing the pattern of a magnetic field of the PMR head shown in FIG. 2 in a down track direction.

FIG. 3 is a graph showing the magnetic characteristics of the conventional PMR head of FIG. 1 and the PMR head 100 of FIG. 2 in a down track direction. The down track direction refers to a direction in which the recording medium 110 proceeds. In FIG. 2, the arrow direction (i.e., the Y direction) corresponds to the down track direction.

Referring to FIG. 3, the PMR head 100 of FIG. 2 according to an exemplary embodiment of the present invention has a greater recording field Hw and a smaller return field Hr than the related art PMR head of FIG. 1.

Table 1 shows the results of a comparison of the PMR head 100 according to the present embodiment of the present invention and the related art PMR head.

TABLE 1

|  | Field Ratio (Hw/Hr) | Recording Field Hw(T) | Return Field Hr(T) | Field Inclination (Oe/nm) |
|---|---|---|---|---|
| Conventional Art | 6.54 | 0.862 | 0.132 | 141.8 |
| Embodiment | 7.71 | 0.894 | 0.116 | 136.8 |
| Enhancement Rate | 17.9% (↑) | 4% (↑) | 12% (↓) | 3.6% (↓) |

The PMR head 100 of FIG. 2, according to the present embodiment of the present invention, has an increased recording field Hw and a reduced return field Hr, so that the field ratio Hw/Hr increased to about 17.9%.

Figure 4:
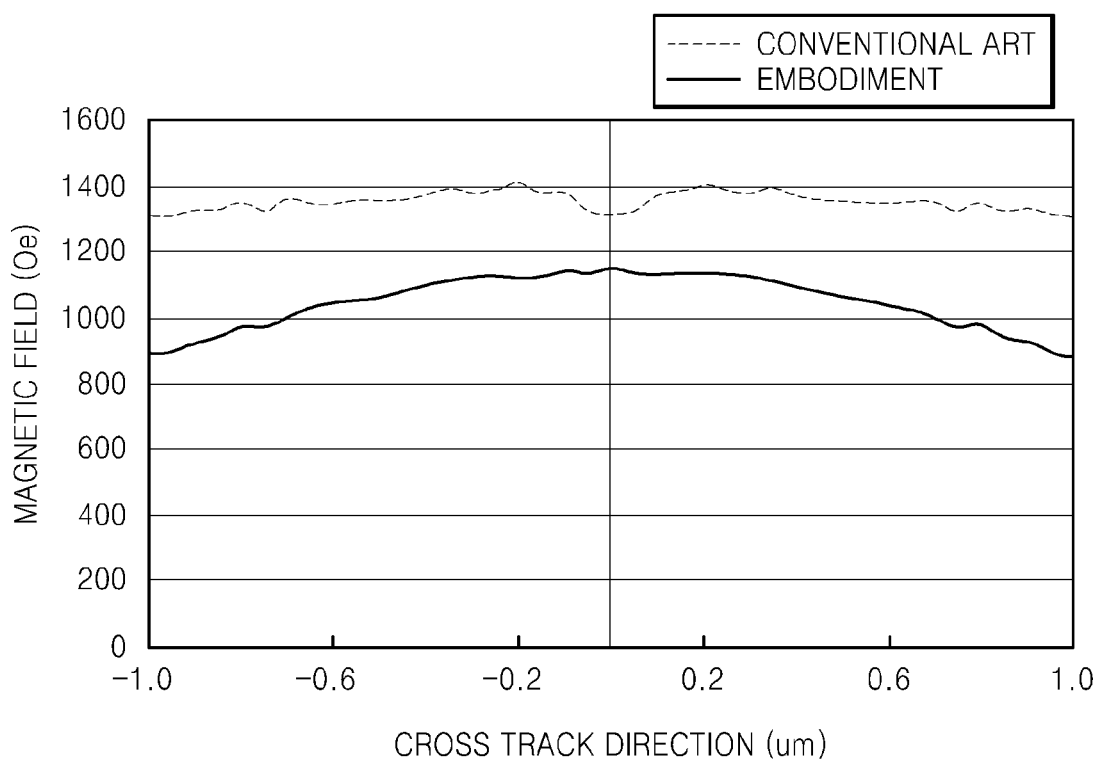
FIG. 4 is a graph showing the pattern of a magnetic field of the PMR head shown in FIG. 2 in a cross track direction.

FIG. 4 is a graph showing the return fields Hr of the conventional PMR head of FIG. 1 and the PMR head 100 of FIG. 2 in a cross track direction that corresponds to a Z direction shown in FIG. 2.

Referring to FIG. 4, the PMR head 100 of FIG. 2, according to the present embodiment of the present invention, exhibits a smaller return field Hr than the conventional PMR head. Also, a difference in the return field Hr between the PMR head 100 of FIG. 2 and the conventional PMR head ranges from 160 to 420 Oe according to the position in the cross track direction and the difference of the return field Hr between the related art PMR head of FIG. 1 and the PMR head 100 of FIG. 2 is larger in the end of a track than in the center of the track. Therefore, it can be seen that the influence on an adjacent track is structurally reduced.

Figure 5:
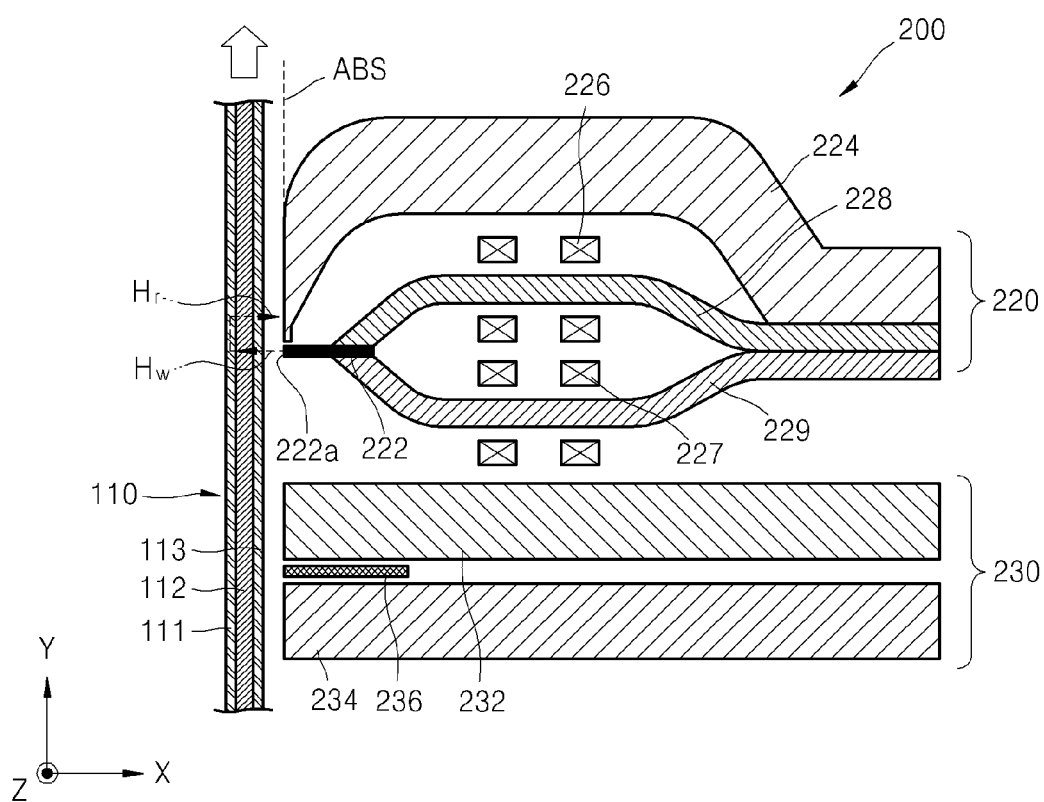
FIG. 5 illustrates a PMR head according to another exemplary embodiment of the present invention.

FIG. 5 illustrates a PMR head 200 according to another exemplary embodiment of the present invention.

Referring to FIG. 5, the PMR head 200 includes a recording head unit 220 for recording data on the recording medium 110. Also, the PMR head 200 may further include a read head unit 230 for reading data recorded on the recording medium 110.

The recording head unit 200 includes a main pole 222, a return yoke 224, a first sub-yoke 228, a second sub-yoke 229, a first coil 226, and a second coil 227. The current embodiment differs from the previous embodiment as described with reference to FIG. 2 in that the recording head unit 220 includes a plurality of sub-yokes and a plurality of coils that enclose the sub-yokes, respectively. The first sub-yoke 228 magnetically connects the main pole 222 with the return yoke 224 to form a magnetic path and aids to focus a magnetic field on an end portion 222a of the main pole 222. Similarly, the second sub-yoke 229 magnetically connects the main pole 222 with the first sub-yoke 228 so as to form a magnetic path and aids to focus a magnetic field on an end portion 222a of the main pole 222. The main pole 222 may be formed of a material having a higher saturation flux density Bs than that of the first sub-yoke 228, the second sub-yoke 229, or the return yoke 224. Also, the first sub-yoke 228, the second sub-yoke 229, or the return yoke 224 may be formed to have a higher magnetic permeability than that of the main pole 222 such that the first sub-yoke 228, the second sub-yoke 229, or the return yoke 224 has a high-speed responsivity to a change in RF magnetic field. The first and second sub-yokes 228 and 229 start from the other end portion of the main pole 222, which is opposite to the end portion 222a, and extend away from the recording medium 110. A predetermined region of each of the first and second sub-yokes 228 and 229 is in contact with the main pole 222. In this case, a minimum region of each of the first and second sub-yokes 228 and 229 required for magnetic connection is in contact with the main pole 222. Furthermore, the first sub-yoke 228 may have a convex shape similar to that of the return yoke 224, and be close to the return yoke 224. The second sub-yoke 229 may have a convex shape in the y direction and the first sub-yoke 228 may have a convex shape in the negative y direction such that the first and second sub-yokes 228 and 229 are symmetrical to each other with respect to the x direction. The first coil 226 can enclose the first sub-yoke 228, and the second coil 227 can enclose the second sub-yoke 229. For example, the first and second coils 226 and 227 may be formed as a type of solenoid or toroid around the first and second sub-yokes 228 and 229, respectively.

The read head unit 230 includes a first shield 232, a second shield 234, and a read sensor 236 interposed between the first and second shields 232 and 234.

Although two sub-yokes are exemplarily described in the current embodiment, that is, the first and second sub-yokes 228 and 229, there can be more than 2 if required. The PMR head 200 according to the current embodiment of the present invention performs substantially the same functions as the PMR head 100 of FIG. 2 and further improves the focusing of a magnetic field on the end portion 222a of the main pole 222 using the first and second sub-yokes 228 and 229 and the first and second coils 226 and 227.

As described above, a PMR head according to the present invention provides a sub-yoke with an improved structure. Thus, a recording field is increased and a return field is reduced so that the PMR head can exhibit high recording density.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A perpendicular magnetic recording (PMR) head for recording data in a PMR medium, the PMR head comprising:
   a main pole comprising a first end portion disposed on an air bearing surface (ABS) that is opposite to the PMR medium, and a second end portion;
   a return yoke spaced apart from the main pole;
   a first sub-yoke starting from the second end portion of the main pole and extending away from the PMR medium, so as to magnetically connect the main pole with the return yoke;
   a first coil disposed to enclose the first sub-yoke;
   a second sub-yoke starting from the second end portion of the main pole and extending away from the PMR medium and the main pole, so as to magnetically connect the main pole with the first sub-yoke; and
   a second coil disposed to enclose the second sub-yoke.

2. The PMR head of claim 1, wherein the first sub-yoke has a convex shape toward the return yoke, and the second sub-yoke has a convex shape in an opposite direction to that of the first sub-yoke.

3. The PMR head of claim 1, wherein the main pole has a higher saturation flux density than any one of the first and second sub-yokes and the return yoke.

4. The PMR head of claim 1, wherein a predetermined region of each of the first and second sub-yokes is in contact with the main pole.

5. A perpendicular magnetic recording (PMR) head comprising:
   a recording head unit for recording data on a PMR medium; and
   a read head unit for reading data recorded on the PMR medium,
   wherein the recording head unit comprises:
   a main pole comprising a first end portion disposed on an air bearing surface (ABS) that is opposite to the PMR medium, and a second end portion;
   a return yoke spaced apart from the main pole;
   a plurality of sub-yokes starting from the second end portion and extending away from the PMR medium and the main pole, so as to magnetically connect the main pole with the return yoke; and
   a plurality of coils disposed to enclose the sub-yokes, respectively.

6. The PMR head of claim 5, wherein at least one of the sub-yokes has a convex shape toward the return yoke.

7. The PMR head of claim 5, wherein the main pole has a higher saturation flux density than any one of the sub-yokes and the return yoke.

8. The PMR head of claim 5, wherein a predetermined region of each of the sub-yokes is in contact with the main pole.

* * * * *